(12) United States Patent
Sridharan et al.

(10) Patent No.: US 11,354,170 B2
(45) Date of Patent: Jun. 7, 2022

(54) CLASSIFYING INFRASTRUCTURE WORKLOADS USING WORKLOAD SEEDS

(71) Applicant: Dell Products L.P., Round Rock, TX (US)

(72) Inventors: Prakash Sridharan, Bangalore (IN); Bud Koch, Austin, TX (US); Sivaram Lakshminarayanan, Bangalore (IN); Shiek Mohammed Gulam Mohamed Hussain, Austin, TX (US); Pronay Sarkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 43 days.

(21) Appl. No.: 16/983,047

(22) Filed: Aug. 3, 2020

(65) Prior Publication Data
US 2022/0035683 A1 Feb. 3, 2022

(51) Int. Cl.
*G06F 9/46* (2006.01)
*G06F 9/50* (2006.01)
*G06F 9/48* (2006.01)

(52) U.S. Cl.
CPC .......... *G06F 9/5083* (2013.01); *G06F 9/4881* (2013.01); *G06F 9/505* (2013.01)

(58) Field of Classification Search
CPC ....... G06F 9/5083; G06F 9/4881; G06F 9/505
See application file for complete search history.

(56) References Cited

U.S. PATENT DOCUMENTS

| | | | |
|---|---|---|---|
| 2007/0256058 A1* | 11/2007 | Marfatia | G06F 8/51 717/137 |
| 2010/0161383 A1* | 6/2010 | Butler | G06Q 10/103 705/28 |
| 2012/0002567 A1* | 1/2012 | Sun | H04W 28/16 370/252 |
| 2017/0024144 A1* | 1/2017 | Hrischuk | G06F 3/0629 |
| 2019/0003931 A1* | 1/2019 | Melchinger | G01N 24/08 |

* cited by examiner

*Primary Examiner* — Camquy Truong
(74) *Attorney, Agent, or Firm* — Terrile, Cannatti & Chambers; Stephen A. Terrile

(57) ABSTRACT

A system, method, and computer-readable medium for performing a workload analysis operation. The workload analysis operation incudes receiving workload data from a data source; defining a plurality of workload seeds, each of the plurality of workload seeds defining a particular type of workload; and, identifying a particular infrastructure configuration using the workload data and the plurality of workload seeds.

17 Claims, 8 Drawing Sheets

| Workload Class 302 | Server Configuration Attributes 342 | | | | | | | | |
|---|---|---|---|---|---|---|---|---|---|
| | CPU Performance 344 | CPU Cache 346 | CPU Cores 348 | CPU RAS 350 | Memory 352 | Storage 354 | I/O 356 | GPU 358 | SaaS Monitoring 360 |
| Data Analytics/AI '1' 304 | H | M | M | L | M | M | L | H | H |
| Data Analytics/AI '2' 306 | H | M | M | L | M | M | L | L | H |
| Database/SQL Mgmt. '1' 308 | H | M | H | H | H | H | H | L | L |
| Database/SQL Mgmt. '2' 310 | H | M | H | H | M | M | H | L | L |
| Database/SQL Mgmt. '3' 312 | H | M | H | H | M | M | H | L | L |
| Database/SQL Mgmt. '4' 314 | H | M | M | H | H | H | H | L | L |
| In Memory Database '1' 316 | H | H | H | H | H | H | M | H | L |
| In Memory Database '2' 318 | H | M | M | L | M | M | M | L | L |
| Business Apps/OLTP 320 | M | M | M | H | M | M | M | L | M |
| HPC Compute 322 | H | M | M | L | M | L | H | H | H |
| Storage Servers 324 | M | M | M | L | M | M | M | L | H |
| Virtual Desktop Infrastructure 326 | H | M | M | L | M | M | M | H | M |
| IT Infrastructure '1' 328 | M | L | M | L | L | H | L | L | M |
| IT Infrastructure '2' 330 | M | L | M | L | L | H | M | L | M |
| IT Infrastructure '3' 332 | M | L | M | L | L | H | H | L | M |

*Figure 3*

| Server Configuration Attribute 342 | | | |
|---|---|---|---|
| Workload Class 302 | CPU Cores 348 | | |
| | Ranked Value 402 | Lower 404 | Upper 406 |
| HPC Compute 322 | L | 2 | 8 |
| | M | 8 | 16 |
| | H | 16 | 24 |

| Workload Class 302 | Server Model 432 | Medoid 452 |
|---|---|---|
| HPC Compute 322 | 'A' (e.g., R730) 434 | 10 |
| HPC Compute 322 | 'B' (e.g., R930) 436 | 14 |
| HPC Compute 322 | 'C' (e.g., R640) 438 | 10 |
| HPC Compute 322 | 'D' (e.g., C4140) 440 | 14 |
| HPC Compute 322 | 'E' (e.g., R739XD) 442 | 10 |

*Figure 4*

H  M  M  L  M  L  H  H  H — Workload Seed 502

| | | Server Configuration Attributes 342 | | | | | | | |
|---|---|---|---|---|---|---|---|---|---|
| Workload Class 302 | Server Model 432 | CPU Performance 344 | CPU Cache 346 | CPU Cores 348 | CPU RAS 350 | Memory 352 | Storage 354 | I/O 356 | GPU 358 | Density 360 |
| HPC Compute 322 | 'A' (e.g., R730) 434 | 12 | 10.5 | 10 | 0 | 512 | 1500 | 560 | 1 | 2 |

CLASSIFYING INFRASTRUCTURE WORKLOADS USING WORKLOAD SEEDS

BACKGROUND OF THE INVENTION

Field of the Invention

The present invention relates to information handling systems. More specifically, embodiments of the invention relate to determining an optimally configured infrastructure configuration for an intended workload.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a workload analysis operation comprising: receiving workload data from a data source; defining a plurality of workload seeds, each of the plurality of workload seeds defining a particular type of workload; and, identifying a particular infrastructure configuration using the workload data and the plurality of workload seeds.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving workload data from a data source; defining a plurality of workload seeds, each of the plurality of workload seeds defining a particular type of workload; and, identifying a particular infrastructure configuration using the workload data and the plurality of workload seeds.

In another embodiment the invention relates to a computer-readable storage medium embodying computer program code, the computer program code comprising computer executable instructions configured for: receiving workload data from a data source; defining a plurality of workload seeds, each of the plurality of workload seeds defining a particular type of workload; and, identifying a particular infrastructure configuration using the workload data and the plurality of workload seeds.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 shows a table of workload classes and corresponding server configuration attributes.

FIG. 4 shows a table of ranked values for a particular server configuration attribute used to select a candidate server model for an associated server workload.

FIG. 5 shows a graphical representation of a workload seed and its corresponding server configuration attributes.

DETAILED DESCRIPTION

Figure 1:
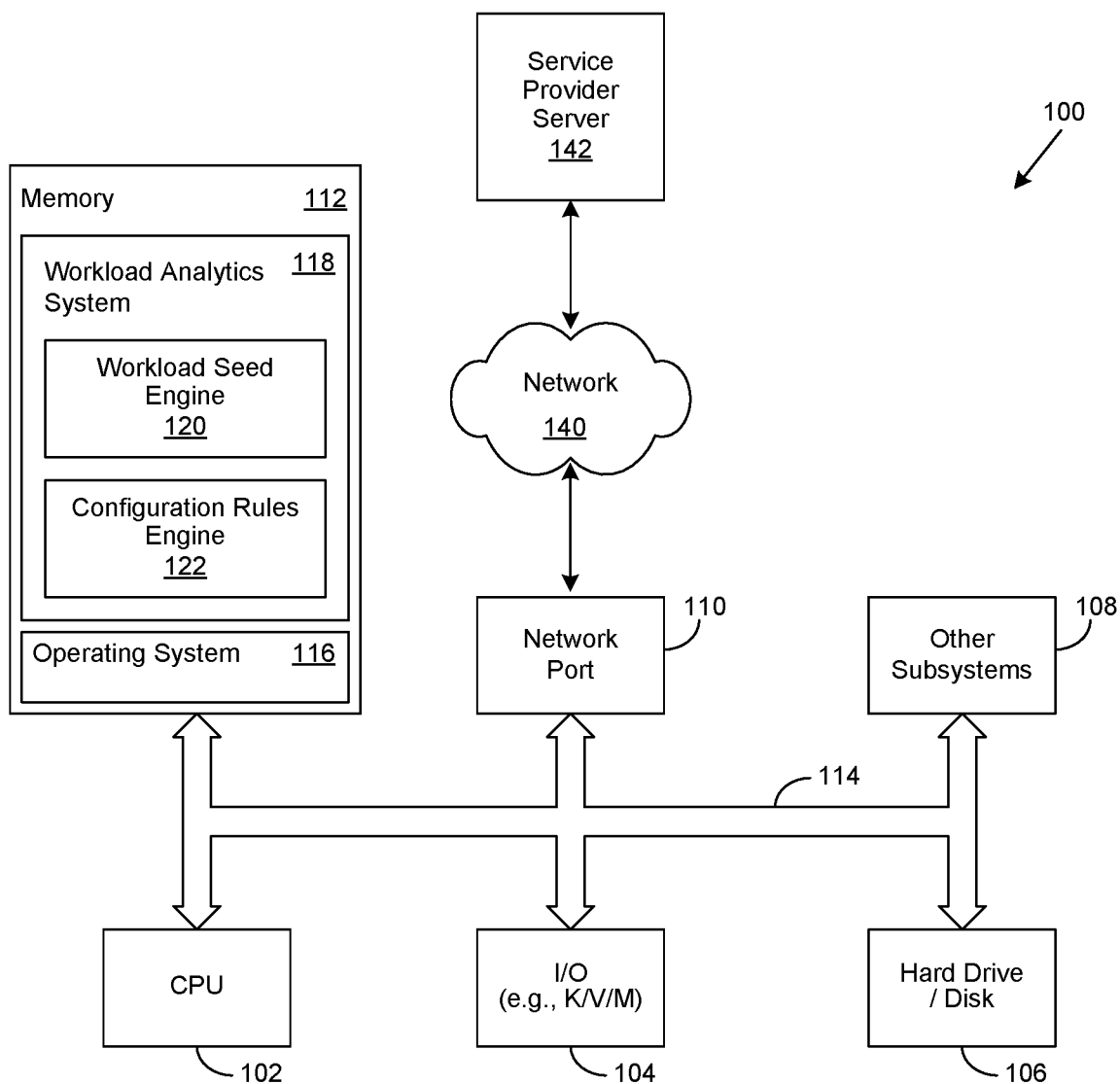
FIG. 1 shows a general illustration of components of an information handling system as implemented in the system and method of the present invention.

A system, method, and computer-readable medium are disclosed for determining an optimally configured infrastructure configuration for an intended workload. Certain aspects of the invention reflect an appreciation that a general purpose information handling system may be used to perform a wide variety of information processing operations, functions, and processes. Various aspects of the invention likewise reflect an appreciation that it is common for certain information handling systems to be designed or configured such that their functionality and performance are optimized for a particular purpose.

In particular, certain aspects of the invention reflect an appreciation that one class of an information handling system is a server, familiar to skilled practitioners of the art. Certain aspects of the invention likewise reflect an appreciation that such servers are often implemented as part of a computing infrastructure, such as a data center. Likewise, certain aspects of the invention reflect an appreciation that a server is often designed or configured for hosting a particular type or class of workload, described in greater detail herein.

Certain aspects of the invention reflect an appreciation that configuring a server typically involves selecting a particular kind of processor, the amount of main memory and storage, the number and type of input/output (I/O) channels and ports, and so forth, to optimize its performance for a particular workload. Certain aspects of the invention likewise reflect an appreciation that the configuration of a particular server for a particular workload, referenced herein as an infrastructure configuration, may evolve, or otherwise change, over time.

As an example, a server configured for one workload may be repurposed for another. As another example, additional processors, memory, storage, and I/O, or a combination thereof, may be added to the original, or as-built, configuration of the server. Likewise, certain server components may be removed or exchanged over time. Certain aspects of the invention reflect an appreciation that such changes to the configuration of a particular server may occur without the knowledge of the original provider of the server.

Likewise, certain aspects of the invention reflect an appreciation that optimizing the configuration of a server for a particular workload is typically dependent on having accurate information related to the current configuration of the server. Certain aspects of the invention likewise reflect an appreciation that it is not uncommon for existing servers to be replaced with newer models of servers, some of which may offer additional configuration choices, options, and capabilities. Accordingly, certain aspects of the invention reflect an appreciation that knowledge of the likely computational demands of a particular workload, based upon historic server configurations, is beneficial when configuring a server for optimal performance when hosting its intended workload.

Certain aspects of the invention reflect an appreciation that it is not uncommon for new computational workloads to emerge, as well as existing workloads to evolve. Likewise, certain aspects of the invention reflect an appreciation that the emergence of new, or evolution of existing, workloads may reflect shifts in information processing paradigms. Accordingly, understanding the effects of such paradigm shifts is advantageous when configuring, or reconfiguring, a server for new or existing workloads, Certain aspects of the invention reflect an appreciation that known approaches to optimizing the configuration of a server for an intended workload include analysis of data resulting from unstructured interactions with customers and users, analysis of server logs, and analysis of information related to applications executing on the server. However, certain aspects of the invention likewise reflect an appreciation that data from unstructured interactions with customers and users may be incomplete, inaccurate, or irrelevant. Likewise, certain aspects of the invention reflect an appreciation that customers are not always willing to share server logs as they may contain sensitive or proprietary information. Various aspects of the invention likewise reflect an appreciation that information associated with certain applications executing on a server may only provide a snapshot of the server's performance for a particular period of time.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a workload analytics system 118. In certain embodiments, the workload analytics system 118 may include a workload seed engine 120, or an infrastructure configuration rules engine 122, or both. In one embodiment, the information handling system 100 is able to download the workload analytics system 118 from the service provider server 142. In another embodiment, the workload analytics system 118 is provided as a service from the service provider server 142.

The workload analytics system 118 performs a workload analytics operation, described in greater detail herein. In certain embodiments, the workload analytics operation may be performed during operation of an information handling system 100. In certain embodiments, the workload analytics operation may result in selecting the optimal infrastructure configuration for an intended workload, as described in greater detail herein.

Figure 2:
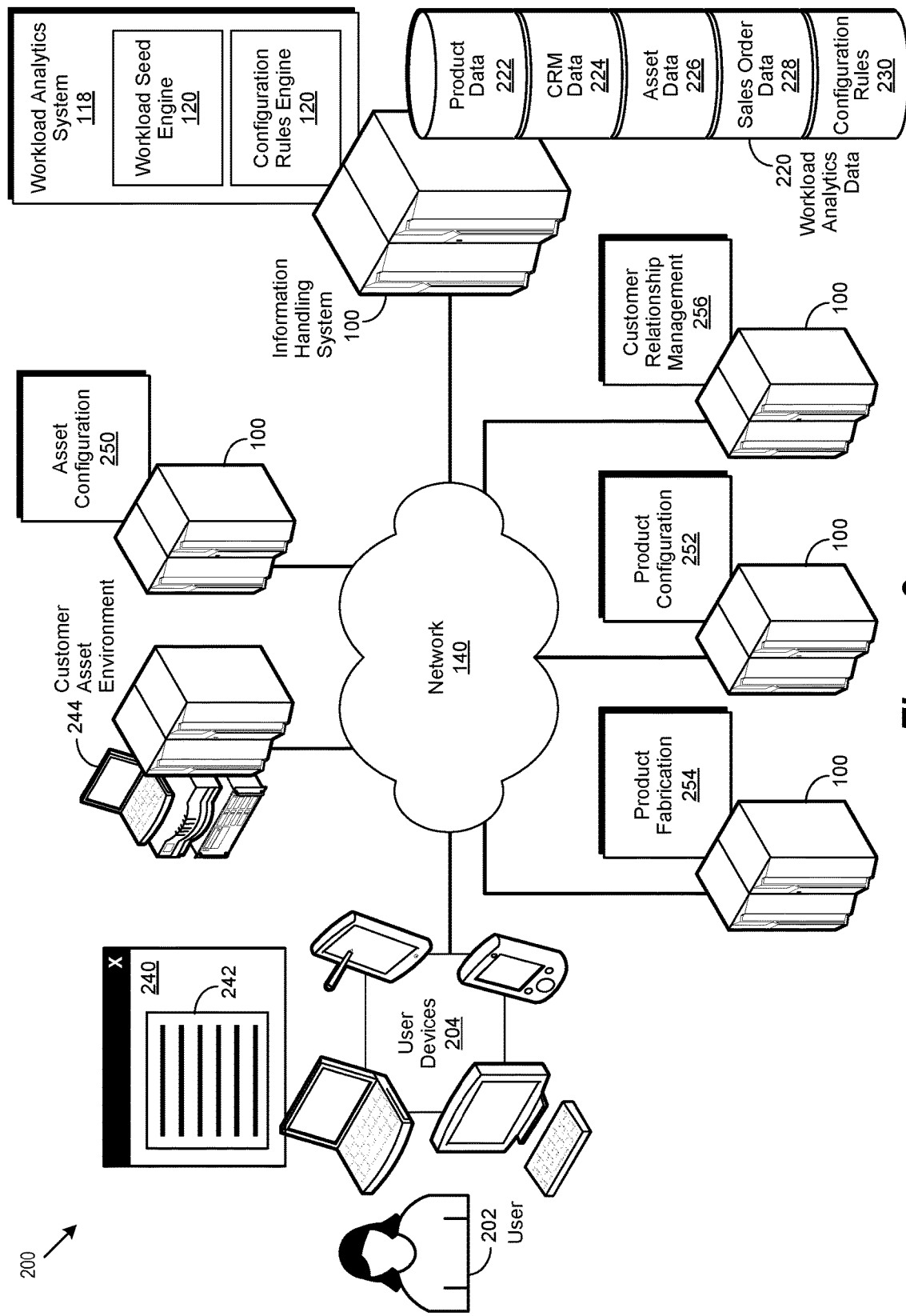
FIG. 2 shows a block diagram of a workload analytics environment.

FIG. 2 is a block diagram of a workload analytics environment implemented in accordance with an embodiment of the invention. In certain embodiments, the workload analytics environment 200 may include a workload analytics system 118. In certain embodiments, the workload analytics environment 200 may include a repository of workload analytics data 220. In certain embodiments, the repository of workload analytics data 220 may be local to the system executing the sales facilitation system 118 or may be executed remotely. In certain embodiments, the repository of workload analytics 220 may include various information associated with product data 222, customer relationship management (CRM) data 224, asset data 226, sales order data 228, and infrastructure configuration rules 230.

As used herein, product data 222 broadly refers to information associated with a product, such as an information handling system, that can be read, measured, and structured into a usable format. For example, product data 222 associated with a particular server may include the number and type of processors it can support, their speed and architecture, minimum and maximum amounts of memory supported, various storage configurations, the number, type, and speed of input/output channels and ports, and so forth. In various embodiments, the product data 222 may likewise include certain performance and configuration information associated with a particular workload, described in greater detail herein. In various embodiments, the product data 222 may include certain public or proprietary information related to infrastructure configurations associated with a particular computational workload. In various embodiments, the product data 222 may likewise include certain workload seed information, likewise described in greater detail herein.

As used herein, customer relationship management (CRM) data 226 broadly refers to any information associated with an interaction with a prospective or existing customer. In certain embodiments, the performance of one or more workload analytics operations, described in greater detail herein, may be stored in the repository of CRM data 226. In various embodiments, certain CRM data 226 may likewise be used in the performance of a workload analytics operation.

As used herein, asset data 226 broadly refers to any information associated with an asset. In certain embodiments, the asset data 226 may include information associated with asset types, asset quantities, asset use types, optimization types, asset workloads, asset performance, support information, and cost factors, or a combination thereof, as described in greater detail herein. In certain embodiments, the asset data 226 may include information associated with asset utilization patterns, likewise described in greater detail herein.

As used herein, an asset broadly refers to anything tangible or intangible that can be owned or controlled to produce value. In certain embodiments, an asset may include a product, a service, or a combination thereof. As used herein, a tangible asset broadly refers to asset having a physical substance, such as currencies or other financial assets, buildings, real-estate, inventories, and commodities of any kind. Other examples of tangible assets may include various types of equipment, such as computing and network devices. Examples of computing devices may include personal computers (PCs), laptop PCs, tablet computers, servers, mainframe computers, Random Arrays of Independent Disks (RAID) storage units, their associated internal and external components, and so forth. Likewise, examples of network devices may include routers, switches, hubs, repeaters, bridges, gateways, and so forth. Further examples of tangible assets may include vehicles, such as bicycles, motorcycles, passenger cars, trucks of any size, configuration or capacity, trains, airplanes of various types, and so forth.

As likewise used herein, an intangible asset broadly refers to an asset that lacks physical substance. Examples of intangible assets may include software, firmware, and other non-physical, computer-based assets. Other examples of intangible assets may include digital assets, such as structured and unstructured data of all kinds, still images, video images, audio recordings of speech, music, and other sounds, and so forth. Further examples of intangible assets may include intellectual property, such as patents, trademarks, copyrights, trade names, franchises, goodwill, and knowledge resources. Those of skill in the art will recognize that many such examples of tangible and intangible assets are possible. Accordingly, the foregoing is not intended to limit the spirit, scope or intent of the invention.

In certain embodiments, the value produced by an asset may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

As used herein, a sales order broadly refers to a collection of data documenting an entity's intent to fulfill an order placed by an ordering entity for a particular asset. In certain embodiments, the sales order may be implemented in part or in whole, in physical form, digital form, or a combination thereof. In certain embodiments, an order for an asset may be in the form of a purchase order. As used herein, a purchase order broadly refers to a commercial document indicating types, quantities, and agreed-upon prices for provision of a particular asset. In certain embodiments, the entity issuing a purchase order may be an individual, a group, or other organization, such as a company or government agency.

In certain embodiments, a sales order may be implemented to include a record of a purchase order issued by an ordering entity. In certain embodiments, the receipt of an ordering entity's purchase order may trigger the creation of a sales order. In certain embodiments, a sales order may be implemented to contain, or reference, one or more purchase orders associated with an ordering entity.

In certain embodiments, a sales order may be implemented in a manufacturing environment to generate one or more work orders. As used herein, a work order broadly refers to a collection of data containing information associated with manufacturing, building, engineering, configuring, or otherwise providing a particular asset, such as a server. In certain embodiments, the information contained in a work order may include instructions of various kinds, cost estimates, forms, dates and times to execute the work order, information related to the locations and entities involved in executing the work order, individual entities associated with the work order, or a combination thereof.

In certain embodiments, the fulfillment of a sales order for a product may include provision of an original digital good, or a copy thereof, a build-to-stock product, a built-to-order product, a configured-to-order product, or an engineered-to-order product. In various embodiments, the fulfillment of an order for a service may include performance of certain operations, processes, or a combination thereof. In certain embodiments, the sales order may be for one or more assets used in a customer asset environment 244.

As likewise used herein, an infrastructure configuration rule 230 broadly refers to a rule used to verify that a particular infrastructure configuration is optimal for an associated workload, as described in greater detail herein. In certain embodiments, the infrastructure configuration rule 230 may be used in the performance of an infrastructure configuration verification operation. In certain embodiments, the infrastructure verification operation may be performed by the workload seed engine 120, the infrastructure configuration rules engine 120, or the two in combination.

As used herein, a customer asset environment 244 broadly refers to a collection of interrelated assets implemented to work in combination with one another for a particular purpose. In certain embodiments, various assets within a complex asset environment may have certain interdependencies. As an example, a data center may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each asset in a customer asset environment 244 may be treated as a separate asset and depreciated individually according to their respective attributes. As an example, a fleet of maintenance vehicles may be made up of a variety of passenger automobiles, delivery vans, light, medium, and heavy duty trucks, fork lifts, and mobile cranes, each of which may have a different depreciation schedule. To continue the example, certain of these assets may be implemented in different combinations to produce an end result. To further illustrate the example, a heavy duty truck may be used to deliver roofing materials, which are then lifted to the rooftop of a commercial structure by a mobile crane, and once in place, installed by a work crew that may have traveled to the job site in various light trucks and vans. As another example, the same heavy duty truck may be used the next day to deliver paver bricks, which are then unloaded with a forklift, and once unloaded, installed by a different work crew that may have used a variety of light trucks to travel to the jobsite.

In certain embodiments, each asset in a customer asset environment 244 may have an associated maintenance schedule and service contract. For example, a customer asset environment 244 such as a data center may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual assets in a customer asset environment 244 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the workload analytics system 118 may include a workload seed engine 120. In certain embodiments, the workload analytics system 118 may be implemented to perform various workload analytics operations. In certain embodiments, the workload analytics operation may be executed to optimize the configuration of an infrastructure configuration, described in greater detail herein, for an intended workload, as described in greater detail herein. In certain embodiments, the workload seed engine 120 may be implemented, as described in greater detail herein, to analyze data associated with a target customer asset environment 244, perform various corresponding workload seed calculations related to a particular workload, and propose associated infrastructure configuration recommendations.

In certain embodiments, a user 202 may use a user device 204 to interact with the workload analytics system 118. As used herein, a user device 204 refers to an information handling system such as a personal computer, a laptop computer, a tablet computer, a personal digital assistant (PDA), a smart phone, a mobile telephone, or other device that is capable of communicating and processing data. In certain embodiments, the user device 204 may be configured to present a workload analytics system user interface (UI) 240. In certain embodiments, the workload analytics system UI 240 may be implemented to present a graphical representation 242 of workload analytics information, which is automatically generated in response to interaction with the workload analytics system 118.

In certain embodiments, the user device 204 may be used to exchange information between the user 202 and the workload analytics system 118, an asset configuration system 250, a product configuration system 252, a product fabrication system 254, and a CRM system 256, or a combination thereof, through the use of a network 140. In certain embodiments, the asset configuration system 250 may be implemented to configure various assets to meet various financial, profit margin, performance, and performance goals, as described in greater detail herein. In various embodiments, the asset configuration system 250 may be implemented to use certain workload analytics data 220 to perform such configurations.

In various embodiments, the product configuration system 252 may be implemented to use certain workload analytics data 220 to optimally configure a server for an intended workload. In various embodiments, the workload analytics data 220 used by the product configuration system 252 may have been generated as a result of certain workload analytics operations, described in greater detail herein, being performed by the workload analytics system 118. In various embodiments, the product configuration system 252 may be implemented to provide certain product configuration information to the product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular configuration.

In various embodiments, the workload analytics system UI 240 may be presented via a website. In certain embodiments, the website may be provided by one or more of the workload analytics system 118, the asset configuration system 250, the product configuration system 252, the product fabrication system 254, or the CRM system 256. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input to a web server.

In certain embodiments, the workload analytics system 118 may be implemented to interact with the asset configuration system 250, the product configuration system 252, the product fabrication system 254, and the CRM system 256, or a combination thereof, each of which in turn may be executing on a separate information handling system 100. In certain embodiments, the workload analytics system 118 may be implemented to interact with the asset configuration system 250, the product configuration system 252, the product fabrication system 254, and the CRM system 256, or a combination thereof to perform a workload analytics operation, as described in greater detail herein.

FIG. 3 shows a table of workload classes and corresponding server configuration attributes implemented in accordance with an embodiment of the invention. In certain embodiments a particular class 302 of workloads may be associated with a plurality of corresponding server attributes 342. As used herein, a server broadly refers to an information processing infrastructure element, such as an information handling system, designed or configured to provide functionality for other information processing infrastructure elements, or associated programs, commonly referred to as clients. Skilled practitioners of the art will be familiar with this information processing architecture, known as the client-server model. Those of skill in the art will likewise be aware that servers can provide various functionalities, generally referred to as services, which typically include sharing data or resources among multiple clients, or performing computational operations or processes for one or more clients.

Certain embodiments of the invention reflect an appreciation that a single server can serve multiple clients, and a single client can use multiple servers. Likewise, certain embodiments of the invention reflect an appreciation that a particular client process may run on the same server or may connect over a network to a different server. Examples of servers oriented towards such client processes include database servers, file servers, electronic mail (email) servers, print servers, web servers, game servers, application servers, and so forth.

In certain embodiments, a server may be implemented to host a particular workload. As used herein, a workload broadly refers to a set of predetermined information processing operations performed by a server within a specified period of time for a particular purpose. In certain embodiments, the workload may include handling client requests, managing server resources, and performing computational operations and processes.

In various embodiments, individual workloads may be grouped into certain server workload classes 302. In certain embodiments, the classification of a particular workload may be based upon the results of a workload analysis operation. As used herein, a workload analysis operation broadly refers to any operation associated with the analysis of a workload's intended purpose and the server configuration attributes 342 most suited for its optimal performance.

In various embodiments, the workload analysis operation may be based on certain workload data received from a data source. In various embodiments, the data source may include certain workload analytics data sourced from repositories of product data, customer relationship management (CRM) data, asset data, and sales order data, described in greater detail herein. In various embodiments, the repository of product data may include data related to certain server configuration attributes 342 of a particular server type or model.

In certain embodiments, such server configuration attributes 342 may include performance 344 characteristics of the server's central processor unit (CPU), the size of its cache 346, the number of CPU cores 348 it may have, and data associated with the CPU's reliability, availability, and serviceability (RAS) 350, or a combination thereof. In certain embodiments, such server configuration attributes 342 may likewise include the amount of memory 352 installed in the server, and the amount of data storage 354 it may have access to, or a combination thereof. Likewise, in certain embodiments, such server configuration attributes 342 may include information related to its input/output (I/O) 356 capabilities, the performance of its graphics processing unit (GPU) 358, if present, and software as a service (SaaS) monitoring 360 capabilities, or a combination thereof. Skilled practitioners of the art will recognize that many such server configuration attributes 342 are possible. Accordingly, the foregoing is not intended to limit the spirit, scope, or intent of the invention.

In certain embodiments, the repository of CRM data may include information gleaned from customer or user interactions. In various embodiments, the repository of asset data may include information related to one or more server configurations commonly associated with certain workloads. In certain embodiments, such server configurations may be provided by one or more industry analysts or other knowledge resources. In certain embodiments, such server configurations may be theoretical, empirically observed, or a combination of the two. In various embodiments, such server configurations may be based upon certain characteristics associated with a particular workload. In various embodiments, such server configurations may be based upon certain reference server and workload implementations, averages of a plurality of substantively similar server configuration and workload implementations, or a combination of the two.

In certain embodiments, the repository of asset data may include information related to the current configuration of a server, its currently assigned workload(s), and performance data associated therewith, or a combination thereof. In various embodiments, the repository of asset data may likewise include information stored in certain server logs associated with a particular server. In various embodiments, the information stored a server log may provide certain information related to the performance of the server when hosting a particular workload.

In certain embodiments, the repository of sales order data may include information related to the original, or as-built, configuration of a server when it was ordered by a customer. Certain embodiments of the invention reflect an appreciation that knowing the original, or as-built, configuration of a server, as well as its current configuration, in combination with understanding the characteristics of its currently assigned workload(s), may prove advantageous when determining an optimal configuration for the server. Those of skill in the art will recognize that many such embodiments are possible. Accordingly, the foregoing is not intended to limit the spirit, scope, or intent of the invention.

In certain embodiments, the workload classes 302 may include workload class 302 variants. For example, as illustrated in the table shown in FIG. 3, workload classes 302 may include workload class 302 variants of data analytics/artificial intelligence (AI) '1' 304 and '2' 306, and workload class 302 variants database/sequential query language (SQL) management '1' 308, '2' (310, '3' 312, and ' '4' 314. Likewise, workload classes 302 may include workload class 302 variants of in memory databases '1' 316 and '2' 318, and workload class 302 variants information technology (IT) infrastructure '1' 328, '2' 330, and '3' 332. Conversely, in certain embodiments, workload classes 302 may not have workload class 302 variants, such as business application/online transaction processing (OLTP) 320, high performance computing (HPC) compute 322, storage servers 324, and virtual desktop infrastructure 326.

As used herein, workload class 302 variants of data analytics/artificial intelligence (AI) '1' 304 and '2' 306 may be broadly characterized as advanced workloads typically used by data scientists for data research and modeling to drive decision making in an organization. Likewise, as used herein, workload class 302 variants of database/sequential query language (SQL) management '1' 308, '2' (310, '3' 312, and ' '4' 3146 may be broadly characterized as a data processing workloads commonly used by many organizations for backend processes that have certain infrastructural requirements to run efficiently. As likewise used herein, workload class 302 variants of in memory databases '1' 316 and '2' 318 may be broadly characterized as purpose-built database workloads that rely primarily on memory for data storage, in contrast to databases that store data on disk or solid state drives (SSDs).

As used herein, the workload class 302 of business application/online transaction processing (OLTP) 320 may be broadly characterized as data processing workloads focused on transaction-oriented tasks typically involving large numbers of transactions associated with inserting, updating, or deleting small amounts of data in a database. Likewise, as used herein, the workload class 302 of high performance computing (HPC) compute 322 may be broadly characterized as research-centric workloads typically seen in organizations operating at the higher end of academic and business innovation, such as pharmaceutical, chemical research, nuclear research, and so forth. As likewise used herein, the workload class 302 of storage servers 324 may be broadly characterized as a server infrastructure workload designed to store data apart from servers hosting computational operations and process, which allows large volumes of data to be stored to be stored for longer terms while being readily accessible.

As used herein, the workload class 302 of virtual desktop infrastructure 326 may be broadly characterized as workloads designed to support faster deployment of compute resources for employees with minimal compute-power client systems. Likewise, as used herein, workload class 302 variants of information technology (IT) infrastructure '1' 328, '2' 330, and '3' 332 may be broadly characterized as workloads that are similar to common business applications, but typically require less computational power. Those of skill in the art will recognize that many such workload classes 302, or variants thereof, are possible. Accordingly, the foregoing is not intended to limit the spirit, scope, or intent of the invention.

In certain embodiments, a ranked value of each server configuration attribute 342 can be set for an associated workload class 302, or variant thereof. In certain embodiments, as shown in FIG. 3, the ranked value of a particular server configuration attribute 342 may be represented as 'H' for "High," 'M' for "Medium," and 'L' for "Low," as described in greater detail herein. As an example, the workload class 302 of business applications/OLTP may have server configuration attribute 342 ranked values of 'M' for CPU performance 344, 'M' for CPU cache 346, 'H' for CPU cores 348, 'H' for CPU RAS 350, 'M' for memory 352, 'M' for storage 354, 'M' for I/O 356, 'L' for GPU 358, and 'M' for SaaS monitoring 360.

As another example, the workload class 302 variants of data analytics/AI '1' 304 and '2' 306 both have server configuration attribute 342 ranked values of 'H' for CPU performance 344, 'M' for CPU cache 346, 'M' for CPU cores 348, 'L' for CPU RAS 350, 'M' for memory 352, 'M' for storage 354, 'LM' for I/O 356, and 'H' for SaaS monitoring 360. However, the workload class 302 variants of data analytics/AI '1' 304 and '2' 306 respectively have server configuration attribute 342 ranked values of 'H' and 'L' for GPU 358. Skilled practitioners of the art will recognize that many such workload classes 302, or variants thereof, are possible. Accordingly, the foregoing is not intended to limit the spirit, scope, or intent of the invention.

FIG. 4 shows a table of ranked values for a particular server configuration attribute used in accordance with an embodiment of the invention to select a candidate server model for an associated server workload. In certain embodiments, lower 404 and upper 406 bounds may be set to establish a numeric range of parameters for each ranked value 402 of each server configuration attribute 342 associated with a particular workload class 302 or variant thereof. For example, as shown in FIG. 4, the server configuration attribute 342 of CPU cores 348 may have the lower 404 bound of its ranked value 402 of 'L' set at 2 cores and its upper 406 bound set at 8 cores for the workload class 302 of HPC compute 322. Accordingly, the range of the ranked value 402 of 'L' is between 2 and 8. Likewise, the server configuration attribute 342 of CPU cores 348 may have the lower 404 bound of its ranked value 402 of 'M' set at 8 cores and its upper 406 bound set at 16 cores, and the lower 404 bound of its ranked value 402 of 'H' set at 16 cores and its upper 406 bound set at 24 cores for the workload class 302 of HPC compute 322. As before, the range of the ranked value 402 of 'M' is between 8 and 16. and the range of the ranked value 402 of 'H' is between 15 and 24.

In certain embodiments, the medoid 452 of each server configuration attribute 342 associated with a particular server model 432 is calculated, using statistical approaches familiar to skilled practitioners of the art. Those of skill in the art will be familiar with the concept of a medoid, which are representative objects of a data set, or a cluster of objects within a data set, whose average dissimilarity to all of the objects in the cluster is minimal. Certain embodiments of the invention reflect an appreciation that medoids are similar in concept to means or centroids. However, medoids are always restricted to be members of the data set. Certain embodiments of the invention likewise reflect an appreciation that medoids are commonly used on data when a mean or centroid cannot be defined, such as a vector in a graph.

For example, as shown in FIG. 4, the medoid value 452 for the server configuration attribute 342 of CPU cores 348 for server model 432 'A' 434 is 10 cores. Likewise, the medoid values 452 for the server configuration attribute 342 of CPU cores 348 for server models 432 'B' 436, 'C' 438, 'D' 440, and 'E' 442 are respectively 14 cores, 10 cores, 14 cores, and 10 cores. In certain embodiments, the table shown in FIG. 3 may be used to determine which server models 432 have one or more server configuration attribute 342 medoid values 452 that most closely match the range of the ranked values 402 of the server configuration attributes 342 of a particular workload class 302. To continue the example, the ranked value 402 of the server configuration attribute 342 of CPU cores 348 for the workload class 302 of HPC compute 322 is 'M,' which has a range of 8 to 16 cores. Accordingly, the server configuration attribute 342 medoid values 452 of CPU cores 348 for server models 432 'A' 434, 'B' 436, 'C' 438, 'D' 440, and 'E' 442 are all within the range of the ranked value 402 of 'M' for the workload class 302 of HPC compute 322 and are therefore acceptable server configurations.

FIG. 5 shows a graphical representation of a workload seed and its corresponding server configuration attributes, as implemented in accordance with an embodiment of the invention. Certain embodiments of the invention reflect that it may not always be possible to have an exact mapping between a set of server configuration attributes 342 associated with a particular server model 432, also referenced herein as an infrastructure configuration, and a corresponding workload class 302, or variant thereof. Accordingly, in certain embodiments, a workload seed 502 may be used to classify a particular infrastructure configuration into an associated workload classes 302.

In certain embodiments, a workload seed 502 may be generated for the combination of every infrastructure configuration and every workload class 302, or variant thereof. In certain embodiments, the workload seed 502 may be generated by combining the medoid values for each individual server configuration attribute 342 associated with a particular server model 432 and an associated workload class 302, or variant thereof. In certain embodiments, the resulting workload seeds 502 may be used to provide a workload vector representation within a multi-dimension vector space for a particular infrastructure configuration and a corresponding workload class 302, or a variant thereof. As an example, as shown in FIG. 5, the medoid values corresponding to individual server configuration attributes 342 associated with server model 432 'A' 434 are combined to generate a workload seed 502 for the workload class 302 of HPC compute 322.

Figure 6:
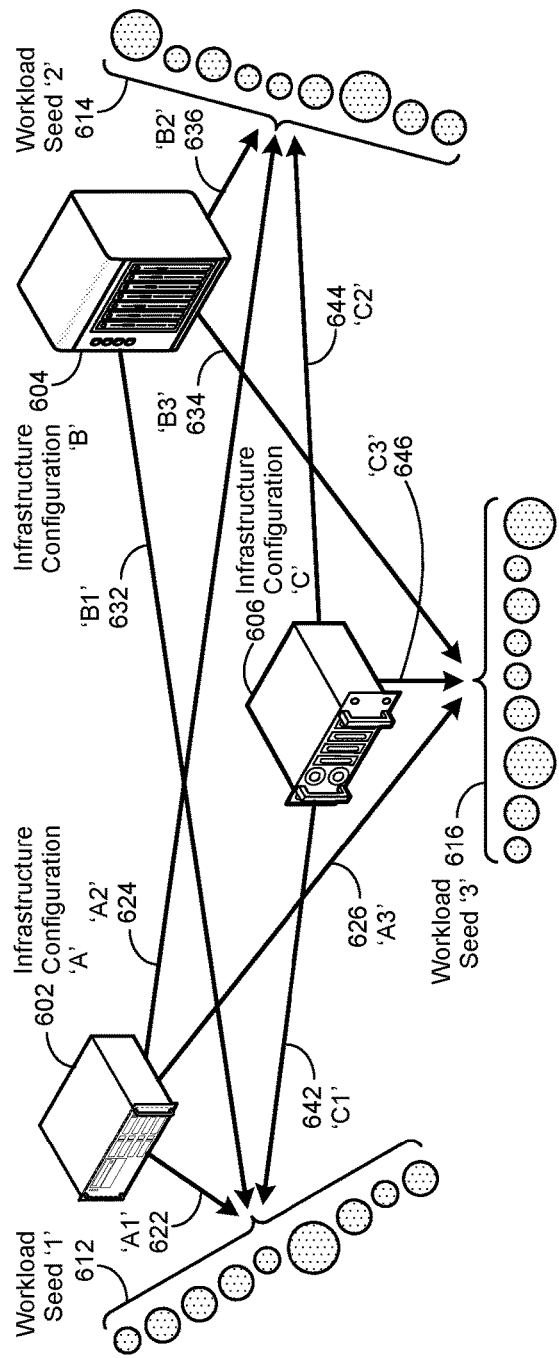
FIG. 6 shows a graphical representation of the relationship between a plurality of infrastructure configurations and a plurality of workload seeds within a multi-dimension vector space.

FIG. 6 shows a graphical representation of the relationship between a plurality of infrastructure configurations and a plurality of workload seeds within a multi-dimension vector space implemented in accordance with an embodiment of the invention. In certain embodiments, a workload vector, described in greater detail herein, may be implemented to compute the distance between a particular workload seed and a particular infrastructure configuration, likewise described in greater detail herein. In certain embodiments, a plurality of workload vectors, respectively corresponding to a plurality of infrastructure configurations and a plurality of workload seeds, may be implemented to determine a workload seed closest to at least one of the infrastructure configurations.

In certain embodiments, the distance between a particular workload seed and a particular infrastructure configuration represented by an associated workload vector may be calculated with the following formula:

$$Distance_{Workload} = \sqrt{(CPU\ Performance_{Config} - CPU\ Performance_{Workload})^2 + \cdots + (Density_{Config} - Density_{Workload})^2}$$

In certain embodiments, the workload vector representing the shortest distance between a target workload and a plurality of infrastructure configurations may indicate the infrastructure configuration most likely to be optimally configured for the target workload. In certain embodiments, the following formula may be used to determine the shortest distance between a target workload and a plurality of infrastructure configurations:

$$Minimum\ Distance_{Workload} = Min(Distance_{Workload\ 1} \ldots, Distance_{Workload\ x})$$

For example, as shown in FIG. 6, a multi-dimensional vector space is defined by first generating workload vectors 'A1' 622, 'A2' 624, and 'A3' 626 to determine the respective distance between infrastructure configuration 'A' 602 and workload seeds '1' 612, '2' 614, and '3' 616. Then, workload vectors 'B1' 632, 'B2' 634, and 'B3' 636 are generated to determine the respective distance between infrastructure configuration 'B' 604 and workload seeds '1' 612, '2' 614, and '3' 616. Thereafter, workload vectors 'C1' 642, 'C2' 644, and 'C3' 646 are generated to determine the respective distance between infrastructure configuration 'C' 606 and workload seeds '1' 612, '2' 614, and '3' 616. To continue the example, the workload seed '3' 616 may be selected to find the most optimal infrastructure. In this example, it may be determined that infrastructure configuration 'C' 606 is the shortest distance from workload seed '3' 616 and its configuration is therefore the most optimal. Likewise, it may be determined that infrastructure configuration 'A' 602 and 'B' 604 are respectively the shortest distance from workload seeds '1' 612 and '2' 614, which are therefore the most optimal configurations for their respective workloads.

Figure 7:
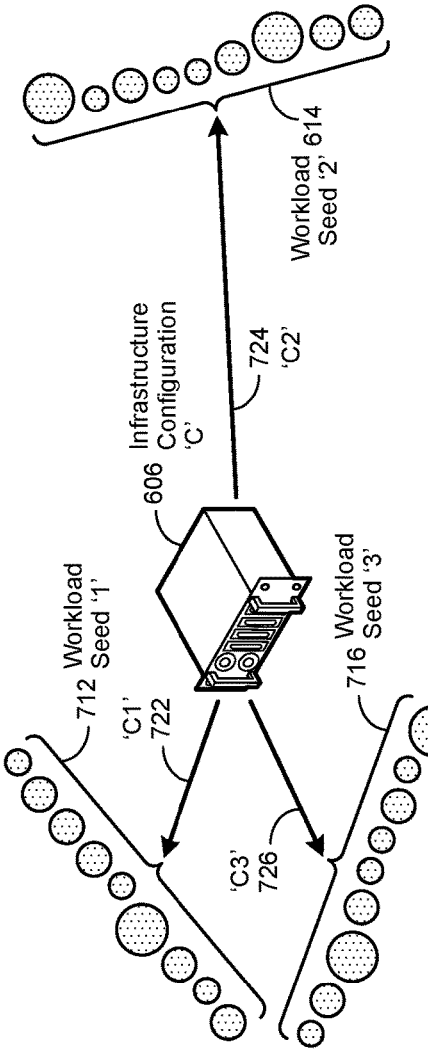
FIG. 7 shows a graphical representation of the relationship between an infrastructure configuration and two workload seeds whose associated workload vectors are substantively similar within a multi-dimensional vector space.

FIG. 7 shows a graphical representation of the relationship between an infrastructure configuration and two workload seeds whose associated workload vectors are substantively similar within a multi-dimensional vector space implemented in accordance with an embodiment of the invention. Certain embodiments of the invention reflect an appreciation that the workspace vector approach described in greater detail herein may not always determine the most optimal infrastructure configuration for a particular workload. Accordingly, in certain embodiments, the workload vector approach of selecting a particular infrastructure configuration may be performed as a preliminary step in determining the most optimal infrastructure configuration for an associated workload. Likewise, various embodiments of the invention reflect an appreciation that there is a possibility that certain infrastructure configurations may reside within the boundaries of a particular workload seed as outliers and be classified with an incorrect workload due to their equidistance in the vector space.

For example, as shown in FIG. 7, workload vectors 'C1' 722, 'C2' 724, and 'C3' 726 are respectively generated to determine their distance between infrastructure configuration 'C' 606 'C1' and workload seeds '1' 712, '2' 614, and '3' 716. As likewise shown in FIG. 7, workload seed '2' 614 is furthest from infrastructure configuration 'C' 606. Furthermore, workload seeds '1' 712 and '3' 716 are equidistant from infrastructure configuration 'C' 606. In this example, workload seeds '1' 712 and '3' 716 may be equally suitable for association with infrastructure configuration 'C' 606, or they may not. Furthermore, it is possible that their respective workload vectors 'C1' 722 and 'C3' 726 may just happen to be equidistant from infrastructure configuration 'C' 606.

In various embodiments, certain infrastructure configuration rules may be implemented to identify the infrastructure configuration that is most optimal for a particular workload. As an example, a particular infrastructure configuration may be identified as a suitable configuration for a particular workload seed due to its proximity. However, practical experience and knowledge of its underlying platform characteristics may indicate that it is better suited to another workload seed. In this example, a infrastructure configuration rule may state that its original association with the workload seed be overridden and a new association be established with a more appropriate workload seed.

Figure 8A:
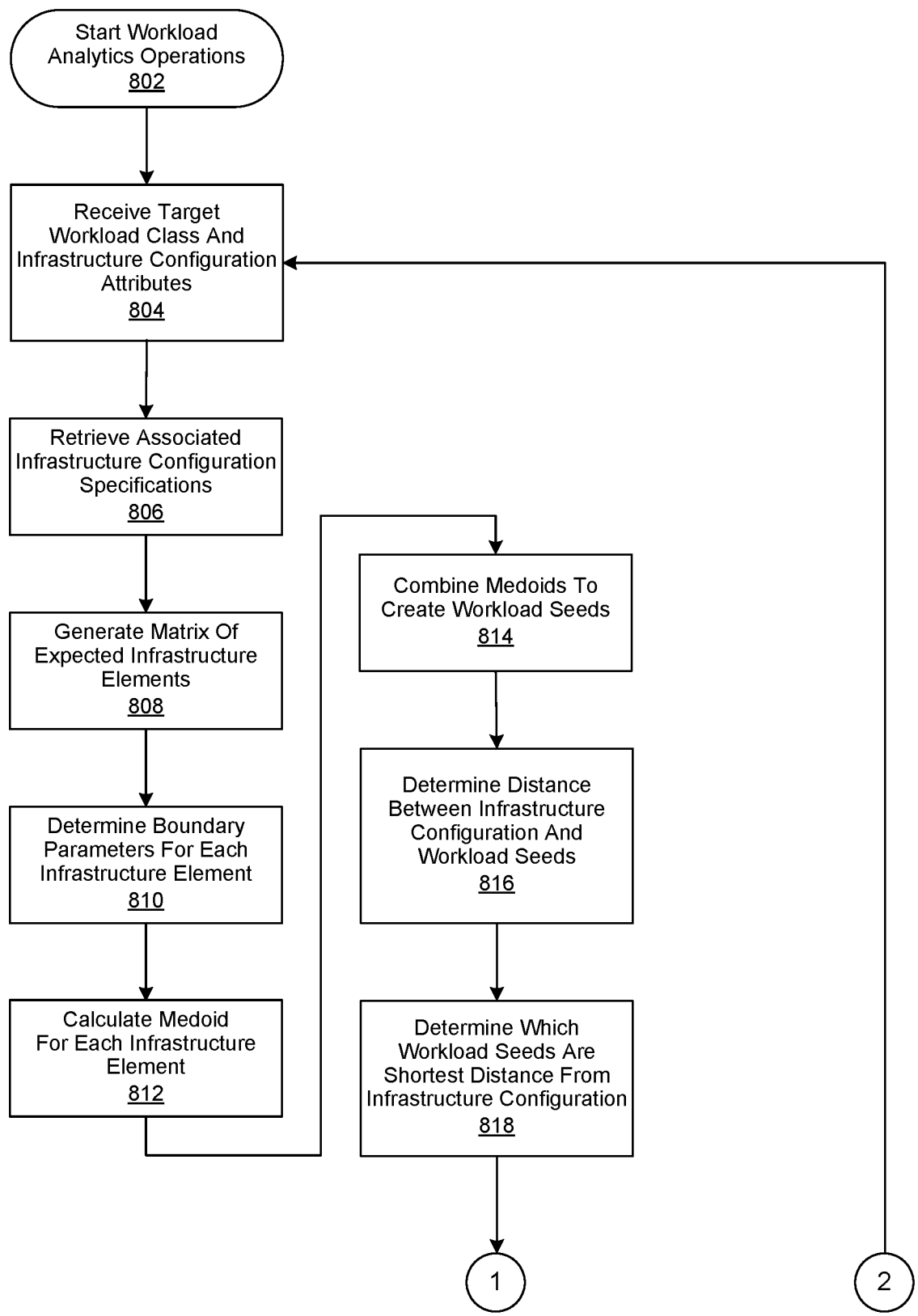
FIGS. 8a and 8b show a flowchart of the performance of workload analytics operations.
Figure 8B:
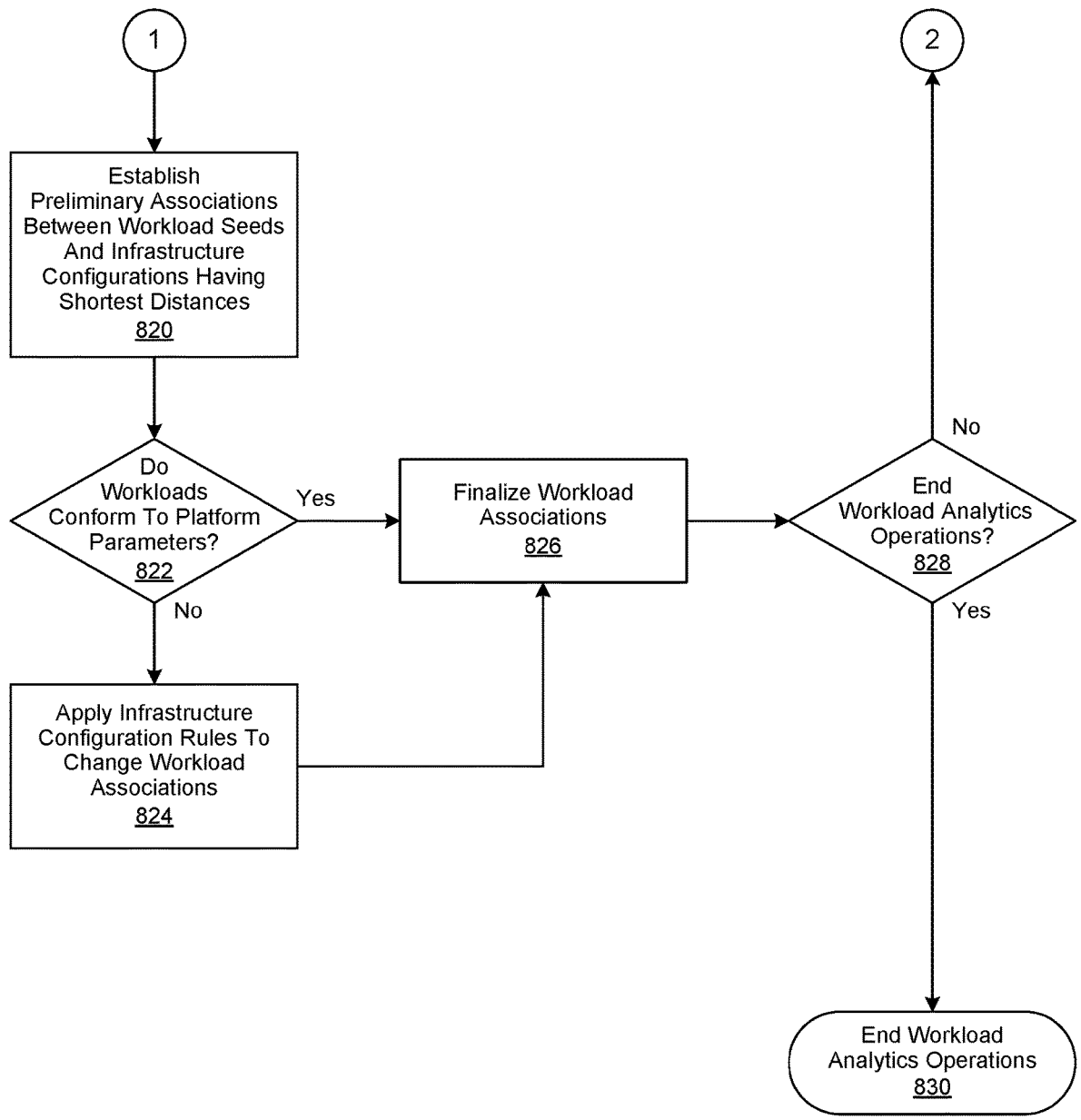

FIGS. 8a and 8b show a flowchart of the performance of workload analytics operations implemented in accordance with an embodiment of the invention. In this embodiment, workload analytics operations are begun in step 802, followed by the receipt of workload class and infrastructure configuration attributes in step 804. Associated infrastructure configuration specifications are then retrieved in step 806, followed by the generation of expected infrastructure elements in step 808. In various embodiments, the expected infrastructure elements may include certain server configuration attributes, described in greater detail herein.

Boundary parameter for each infrastructure element is then determined in step 810, followed by the calculation of their associated medoid in step 812, as likewise described in greater detail herein. The resulting medoids are then combined in step 814 to generate associated workload seeds. The distance between each workload seed and each infrastructure configuration is then determined, likewise as described in greater detail herein, in step 816.

A determination is then made in step 818 as to which workload seeds are the shortest distance from each infrastructure configuration, followed by establishing a preliminary association between those that are in step 820. A determination is then made in step 822 whether the preliminarily associated workload seeds conform to the corresponding infrastructure configuration platform parameters. If not, the infrastructure configuration rules are applied in step 824 to associate the configuration infrastructure with workload seeds that do.

Thereafter, or if it was determined in step 822 that the preliminarily associated workload seeds conform to the corresponding infrastructure configuration platform parameters, workload seed associations are finalized in step 826. A determination is then made in step 828 whether to continue workload analytics operations. If so, then the process is continued, proceeding with step 804. Otherwise, workload analytics operations are ended in step 830.

Figure 9:
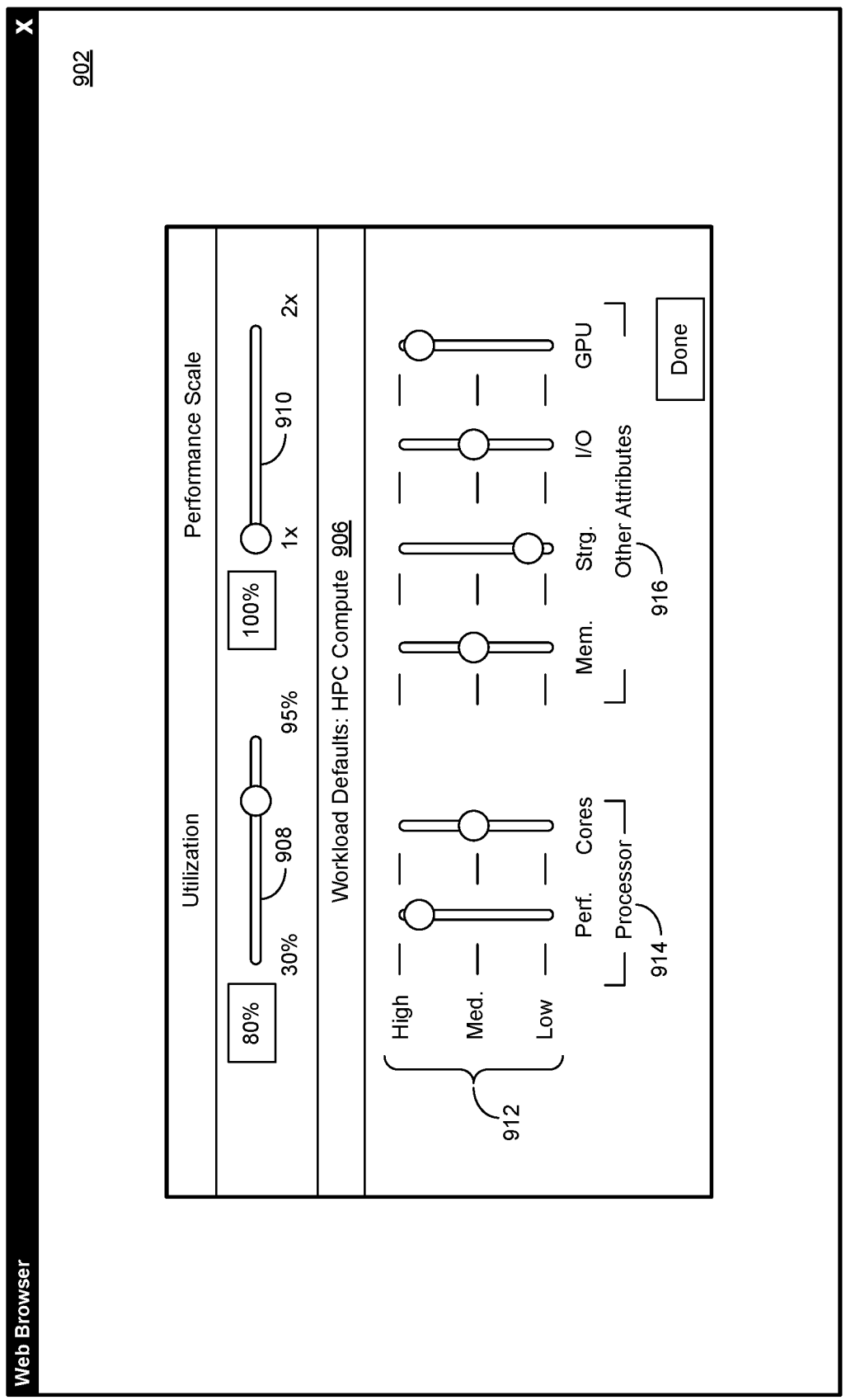
FIG. 9 shows an example screen presentation of a workload analytics system user interface.

FIG. 9 shows an example screen presentation of a workload analytics system user interface (UI) implemented in accordance with an embodiment of the invention. In this embodiment, a workload analytics system UI 902 is implemented to display the utilization 908 and performance scale 910 for a particular workload 906, described in greater detail herein. As shown in FIG. 9, the default ranked values 912 are likewise displayed for an infrastructure configuration, likewise described in greater detail herein, for its processor 914 and other attributes 916.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a workload analysis operation, comprising:
   receiving workload data from a data source;
   defining a plurality of workload seeds, each of the plurality of workload seeds defining a particular type of workload;
   identifying a particular infrastructure configuration using the workload data and the plurality of workload seeds, the identifying the particular infrastructure configuration comprises computing distances between a plurality of infrastructure configurations and the plurality of workload seeds; and, determining a workload seed closest to at least one of the plurality of infrastructure configurations.

2. The method of claim 1, further comprising:
classifying the particular infrastructure configuration into a workload class.

3. The method of claim 1, wherein:
the data source comprises at least one of an external unstructured data source and an internal data source.

4. The method of claim 1, wherein:
computing distances comprises arranging the plurality of infrastructure configurations within a particular vector space; and,
the determining the workload seed closest to the at least one of the plurality of infrastructure components comprises identifying an infrastructure configuration having a minimum distance between the infrastructure configuration and a workload seed of the plurality of workload seeds.

5. The method of claim 1, wherein:
identifying the particular infrastructure configuration comprises applying a rule to identify the particular infrastructure configuration.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
receiving workload data from a data source;
defining a plurality of workload seeds, each of the plurality of workload seeds defining a particular type of workload;
identifying a particular infrastructure configuration using the workload data and the plurality of workload seeds, the identifying the particular infrastructure configuration comprises computing distances between a plurality of infrastructure configurations and the plurality of workload seeds; and,
determining a workload seed closest to at least one of the pluralities of infrastructure configurations;
establish preliminary associations between workload seeds and infrastructure configurations having shortest distances;
if workloads conform to platform parameter, finalize workload associations;
if workloads do not conform platform parameter, apply infrastructure configuration rules to change workload associations.

7. The system of claim 6, wherein the instructions executable by the processor are further configured for:
classifying the particular infrastructure configuration into a workload class.

8. The system of claim 6, wherein:
the data source comprises at least one of an external unstructured data source and an internal data source.

9. The system of claim 6, wherein:
computing distances comprises arranging the plurality of infrastructure configurations within a particular vector space; and,
the determining the workload seed closest to the at least one of the plurality of infrastructure components comprises identifying an infrastructure configuration having a minimum distance between the infrastructure configuration and a workload seed of the plurality of workload seeds.

10. The system of claim 6, wherein:
identifying the particular infrastructure configuration comprises applying a rule to identify the particular infrastructure configuration.

11. A non-transitory, computer-readable storage medium embodying computer program code, the computer program code comprising computer executable instructions configured for:
receiving workload data from a data source;
defining a plurality of workload seeds, each of the plurality of workload seeds defining a particular type of workload;
identifying a particular infrastructure configuration using the workload data and the plurality of workload seeds, the identifying the particular infrastructure configuration comprises computing distances between a plurality of infrastructure configurations and the plurality of workload seeds; and,
determining a workload seed closest to at least one of the pluralities of infrastructure configurations;
establish preliminary associations between workload seeds and infrastructure configurations having shortest distances;
if workloads conform to platform parameter, finalize workload associations;
if workloads do not conform platform parameter, apply infrastructure configuration rules to change workload associations.

12. The non-transitory, computer-readable storage medium of claim 11, wherein the computer executable instructions are further configured for:
classifying the particular infrastructure configuration into a workload class.

13. The non-transitory, computer-readable storage medium of claim 11, wherein:
the data source comprises at least one of an external unstructured data source and an internal data source.

14. The non-transitory, computer-readable storage medium of claim 11, wherein the computer executable instructions are further configured for:
computing distances comprises arranging the plurality of infrastructure configurations within a particular vector space; and,
the determining the workload seed closest to the at least one of the plurality of infrastructure components comprises identifying an infrastructure configuration having a minimum distance between the infrastructure configuration and a workload seed of the plurality of workload seeds.

15. The non-transitory, computer-readable storage medium of claim 11, wherein:
identifying the particular infrastructure configuration comprises applying a rule to identify the particular infrastructure configuration.

16. The non-transitory, computer-readable storage medium of claim 11, wherein:
the computer executable instructions are deployable to a client system from a server system at a remote location.

17. The non-transitory, computer-readable storage medium of claim 11, wherein:

the computer executable instructions are provided by a service provider to a user on an on-demand basis.

* * * * *